United States Patent
Shiono

(10) Patent No.: US 9,264,602 B2
(45) Date of Patent: Feb. 16, 2016

(54) OPTICAL APPARATUS THAT PERFORMS MANUAL FOCUS SHOOTING, AND FOCUSING METHOD

(71) Applicant: CANON KABUSHIKI KAISHA, Tokyo (JP)

(72) Inventor: Masato Shiono, Hadano (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/444,080

(22) Filed: Jul. 28, 2014

(65) Prior Publication Data

US 2015/0042867 A1 Feb. 12, 2015

(30) Foreign Application Priority Data

Aug. 7, 2013 (JP) .................................. 2013-164131

(51) Int. Cl.
| | | |
|---|---|---|
| *H04N 5/232* | (2006.01) | |
| *G03B 13/36* | (2006.01) | |
| *G02B 7/10* | (2006.01) | |
| *G02B 7/38* | (2006.01) | |
| *G03B 13/32* | (2006.01) | |
| *G02B 7/28* | (2006.01) | |

(52) U.S. Cl.
CPC .............. *H04N 5/23212* (2013.01); *G02B 7/10* (2013.01); *G02B 7/28* (2013.01); *G02B 7/38* (2013.01); *G03B 13/32* (2013.01); *G03B 13/36* (2013.01); *G03B 2205/0053* (2013.01)

(58) Field of Classification Search
None
See application file for complete search history.

(56) References Cited

U.S. PATENT DOCUMENTS

| | | | | |
|---|---|---|---|---|
| 5,654,757 A | * | 8/1997 | Murakami | G02B 7/102 348/207.99 |
| 6,301,441 B1 | * | 10/2001 | Kato | G02B 7/08 396/131 |
| RE43,504 E | * | 7/2012 | Yasuda | H04N 5/23212 348/345 |
| 8,305,484 B2 | * | 11/2012 | Hyodo | G03B 3/12 348/345 |
| 2011/0249150 A1 | * | 10/2011 | Shintani | H04N 5/23212 348/240.3 |
| 2013/0148007 A1 | * | 6/2013 | Toyama | G02B 7/08 348/345 |

FOREIGN PATENT DOCUMENTS

JP 2008-298956 A 12/2008

* cited by examiner

*Primary Examiner* — Sinh Tran
*Assistant Examiner* — Mark Monk
(74) *Attorney, Agent, or Firm* — Rossi, Kimms & McDowell LLP

(57) ABSTRACT

An optical apparatus which is capable of, when performing manual focus shooting, freely adjusting a rack focus speed and stabilizing a final focusing accuracy for a shooting subject. Operation of the focus lens, which is driven in a direction of an optical axis by a motor, is controlled in accordance with rotation of a manual focus ring. A position of the focus lens in the direction of the optical axis, which is detected when the focus lens lies at a predetermined position, is stored in a storage unit. According to the relationship between a signal indicative of a current position of a focus lens and a signal indicative of a position of the focus lens, which is stored in the storage unit, the amount by which the focus lens is driven relative to rotation of a manual focus ring is changed.

5 Claims, 9 Drawing Sheets

OPTICAL APPARATUS THAT PERFORMS MANUAL FOCUS SHOOTING, AND FOCUSING METHOD

BACKGROUND OF THE INVENTION

1. Field of the Invention

The present invention relates to an optical apparatus such as a digital camera or a digital video camera, and a focusing method, and in particular to a technique for driving an image pickup lens which the optical apparatus has.

2. Description of the Related Art

Some image pickup apparatuses such as digital cameras and digital video cameras are configured to be able to use a shooting method in which a focus lens is manually driven to focus on a shooting subject so that the rack focus speed (focusing) can be freely adjusted. This shooting method will hereafter be referred to as "manual focus shooting".

In relation to manual focus shooting, there has been proposed a technique of displaying a warning when a focus lens is moved in a wrong direction by mistake with respect to a subject (see Japanese Laid-Open Publication (Kokai) No. 2008-298956). According to this technique, a focus lens is never moved in a wrong direction by mistake, and moreover, the rack focus speed can be freely adjusted.

According to the technique described in Japanese Laid-Open Publication (Kokai) No. 2008-298956, however, a final focusing accuracy for a subject lacks stability because it depends on checking of the focus by a user or visual recognition of a distance meter provided in a lens barrel.

SUMMARY OF THE INVENTION

The present invention provides an optical apparatus which is capable of, when performing manual focus shooting, freely adjusting a rack focus speed, and stabilizing a final focusing accuracy for a shooting subject.

Accordingly, a first aspect of the present invention provides a first aspect of the present invention provides an optical apparatus comprising a focus lens configured to be movable in a direction of an optical axis, a manual focus ring configured to be rotatable, a drive unit configured to drive the focus lens in the direction of the optical axis, a drive control unit configured to control operation of the focus lens via the drive unit in accordance with rotation of the manual focus ring, a position detecting unit configured to detect a position of the focus lens in the direction of the optical axis, a storage unit configured to store the position of the focus lens detected by the position detecting unit when the focus lens lies at a predetermined position, and a focusing control unit configured to, according to a relationship between a signal indicative of a current position of the focus lens, which is detected by the position detecting unit, and a signal indicative of the position of the focus lens, which is stored in the storage unit, change an amount by which the focus lens is driven relative to rotation of the manual focus ring, independently of the drive control unit.

Accordingly, a second aspect of the present invention provides an optical apparatus comprising a focus lens configured to be movable in a direction of an optical axis, a manual focus ring configured to be rotatable, a drive unit configured to drive the focus lens in the direction of the optical axis, a drive control unit configured to control operation of the focus lens via the drive unit in accordance with rotation of the manual focus ring, a focus state detecting unit configured to detect a focusing state with respect to a subject, and a focusing control unit configured to, when an amount of defocus with respect to a main subject, which is detected by the focus state detecting unit, becomes equal to or smaller than a predetermined value, change an amount by which the focus lens is driven relative to rotation of the manual focus ring, independently of the drive control unit.

Accordingly, a third aspect of the present invention provides a focusing method implemented by an optical apparatus, comprising a storage step of storing a position of a focus lens in a direction of an optical axis when the focus lens focuses on a first subject, a focusing step of focusing on a second subject different from the first subject, a driving step of, according to a rotating speed of a manual focus ring, driving the focus lens from a state of focusing on the second subject into a state of focusing on the first subject, a detecting step of detecting a current position of the focus lens, and a control step of, when the current position of the focus lens, which is detected in the detecting step, comes near the position of the focus lens, which is stored in the storage step, decreasing a speed at which the focus lens is driven, and when the current position of the focus lens, which is detected in the detecting step, coincides with the position of the focus lens, which is stored in the storage step, stopping driving the focus lens.

Accordingly, a fourth aspect of the present invention provides a focusing method implemented by an optical apparatus, comprising a detecting step of, when driving a focus lens from a state of focusing on a subject different from a main subject into a state of focusing on the main subject according to a rotating speed of a manual focus ring, detecting an amount of defocus with respect to the main subject, and a drive control step of, when the amount of defocus with respect to the main subject, which is detected in the detecting step, becomes equal to or smaller than the predetermined value, decreasing a speed at which the focus lens is driven, and when the amount of defocus with respect to the main subject becomes zero, stopping driving the focus lens.

According to the present invention, the drive unit drives the focus lens in the direction of the optical axis in accordance with a rotating operation of the manual focus ring. On this occasion, independently of the drive unit, the amount by which the focus lens is driven relative to rotation of the manual focus ring can be changed according to the relationship between a signal indicative of a current position of the focus lens and a signal indicative of a position of the focus lens, which is stored in the storage unit. As a result, during manual focus shooting, the user can freely adjust the rack focus speed and stabilize the final focusing accuracy for a shooting subject.

Further features of the present invention will become apparent from the following description of exemplary embodiments (with reference to the attached drawings).

DESCRIPTION OF THE EMBODIMENTS

The present invention will now be described with reference to the drawings showing embodiments thereof. Here, a so-called digital video camera is taken as an exemplary optical apparatus according to the present invention, but the present invention is not limited to this.

Figure 1:
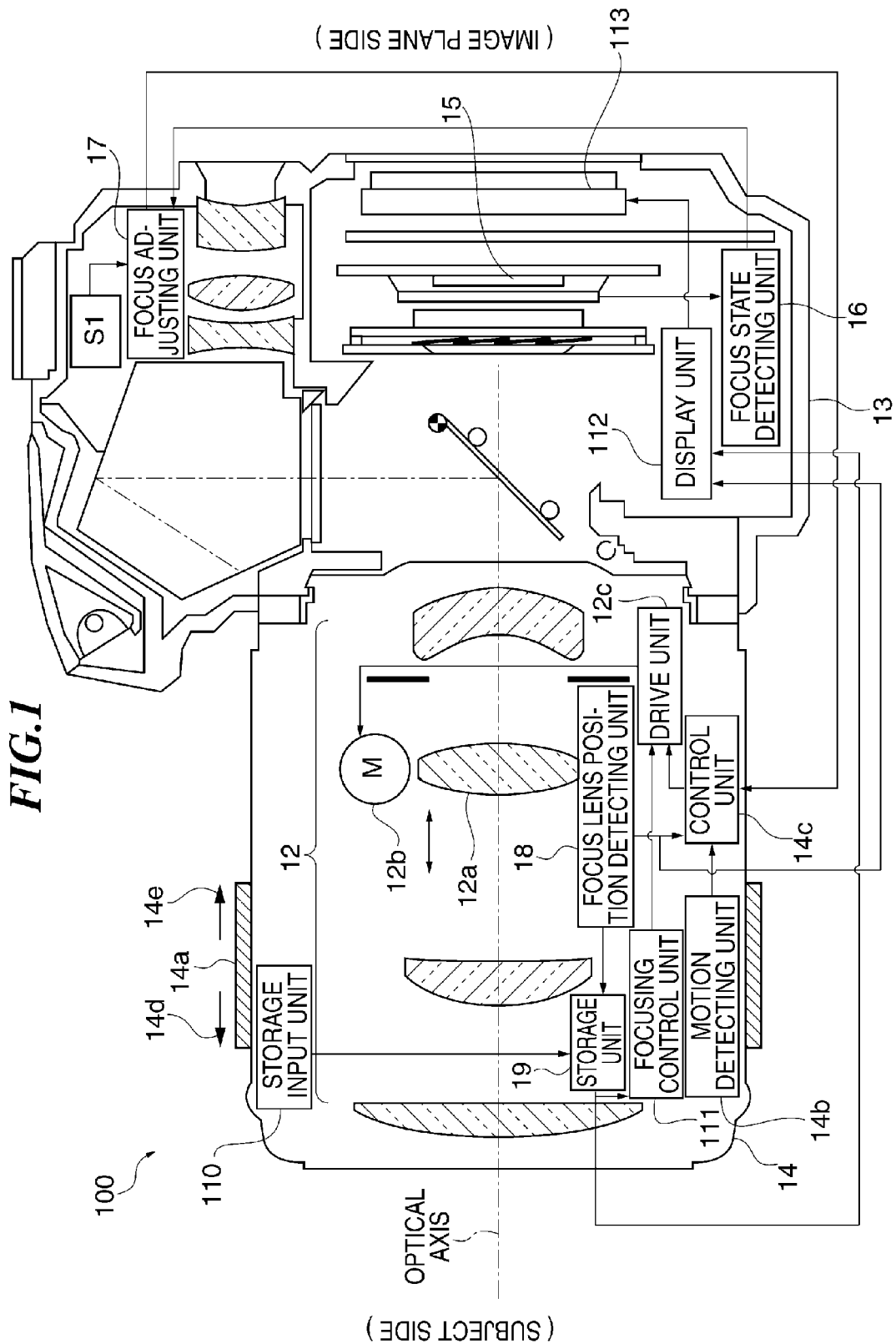
FIG. 1 is a cross-sectional view schematically showing a construction of a digital video camera according to a first embodiment of the present invention.

FIG. 1 is a cross-sectional view schematically showing a constitution of a digital video camera 100 according to an embodiment of the present invention. It is assumed here that an imaging optical system 12 of the digital video camera 100 has four lens groups. A focus lens 12a in the imaging optical system 12 which is disposed on the third place as viewed from a subject and for use in focus adjustment is a subject of explanation, and description of the other lenses is omitted. The focus lens 12a is capable of moving along an optical axis by drive force of a motor 12b, which is driven in accordance with a drive signal supplied from a drive unit 12c.

The digital video camera 100 has a camera main body 13, and a lens barrel 14 holding the imaging optical system 12, and the lens barrel 14 is attachable and detachable to and from the camera main body 13. An image pickup device 15 is disposed in the camera main body 13, and a light bundle from a subject which has passed through the imaging optical system 12 forms an image on the image pickup device 15.

A manual focus ring 14a for operating the focus lens 12a at the time of manual focus shooting is disposed on the lens barrel 14, and the manual focus ring 14a is rotatable at a location where it is disposed. The lens barrel 14 has a motion detecting unit 14b that detects motion (rotation) of the manual focus ring 14a relative to the lens barrel 14, and a control unit (drive control unit) 14c that controls operation of the focus ring 12a via the drive unit 12c based on an output signal from the motion detecting unit 14b and an output signal from a focus adjusting unit 17, to be described later.

The digital video camera 100 has a focus state detecting unit 16 and the focus adjusting unit 17. The focus state detecting unit 16 detects a focus state (focused state) based on an output signal from the image pickup device 15. It should be noted that a focus state is detected by a well-known technique using a contrast evaluation value of an image signal from the image pickup device 15, a phase difference signal between light bundles incident from different pupils, or the like. The focus adjusting unit 17 supplies information for driving the focus lens 12a to the control unit 14c based on an output signal from the focus state detecting unit 16.

The lens barrel 14 has a focus lens position detecting unit 18, a storage unit 19, a storage input unit 110, and a focusing control unit 111. The focus lens position detecting unit 18 detects a position of the focus lens 12a in a direction of the optical axis. The storage unit 19 stores a position of the focus lens 12a, which is obtained based on an output signal from the focus lens position detecting unit 18, according to an output from the storage input unit 110.

The storage input unit 110 outputs a signal when the manual focus ring 14a is operated in a direction of an arrow 14d (toward a subject) along the optical axis. Namely, when the manual focus ring 14a is operated in the direction of the arrow 14d, a position of the focus lens 12a at this time point is stored in the storage unit 19. In response to the manual focus ring 14a being operated in a direction of an arrow 14e (toward an image plane), a signal indicative of the position of the focus lens 12a stored in the storage unit 19 (hereafter referred to as the "position signal") is reset by a signal from the storage input unit 119, which is related to the operation.

The focusing control unit 111 controls the drive unit 12c independently from the control unit 14c based on the position signal stored in the storage unit 19. Specifically, even when the drive unit 12c is driving the focus ring 12a under the control of the control unit 14c based on an output signal from the motion detecting unit 14b, the focusing control unit 111 decreases the speed at which the focus lens 12a is driven as the current position of the focus lens 12a comes near a focus lens position stored in the storage unit 19. When those positions coincide with each other, the focusing control unit 111 stops driving the focus lens 12a.

Namely, in the present embodiment, the amount by which the focus lens 12a is driven relative to movement of the manual focus ring 14a is changed according to the relationship between a signal indicative of the current position of the focus lens 12a detected by the focus lens position detecting unit 18 and a position signal stored in the storage unit 19.

Next, a description will be given of camera actions by the digital video camera 100 when performing manual focus shooting in accordance with operation by a user.

Prior to actual shooting, the user drives the focus lens 12a with respect to a position of a first subject (a main subject shot in actual shooting) at the end of actual shooting by using the focus state detecting unit 16, the focus adjusting unit 17, the control unit 14c, the drive unit 12c, and the motor 12b. This is actually an operation in which the first subject is laid at a predetermined position at the end of actual shooting and focused on by auto focusing.

The user then operates the manual focus ring 14a in a direction of the arrow 14d. As a result, the storage input unit 110 outputs a signal, and the storage unit 19 stores a focus lens position, which is an output from the focus lens position detecting unit 18 when the first subject is focused on by auto focusing.

The user then drives the focus lens 12a with respect to a position of a second subject at the start of shooting using the focus state detecting unit 16, the focus adjusting unit 17, the control unit 14c, the drive unit 12c, and the motor 12b. This is actually an operation in which the second subject is laid at a predetermined position at the start of actual shooting and focused on by auto focusing.

Next, actual shooting is started. The user starts actual shooting and rotates the manual focus ring 14a to manually shift the focus from the second subject position to the first subject position. Because this rack focus is manually done, the focus can be shifted at a speed desired by the user. Here, the rack focus speed cannot be roughly estimated when the relationship among a focus position at the start of actual shooting, a focus position at a present moment when the manual focus ring 14a is being rotated, and a target focus position targeted at the end of real shooting is unknown.

The digital video camera 100 is equipped with a display unit 112 that displays a current position of the focus lens 12b, which is detected by the focus lens position detecting unit 18, and a position signal stored in the storage unit 19, as positional information on the focus lens 12a. Concrete examples of the display unit 112 include a liquid crystal monitor and an organic EL monitor.

Figure 2:
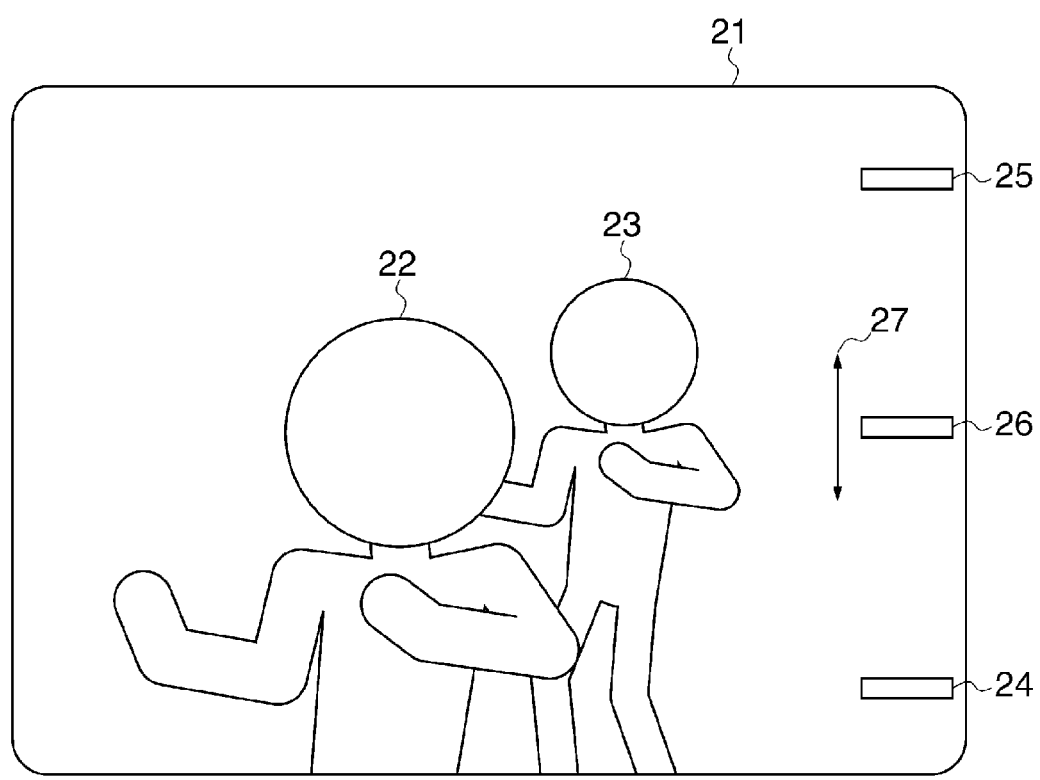
FIG. 2 is a view showing an exemplary shooting composition displayed on a display unit which the digital video camera in FIG. 1 has.

FIG. 2 is a view showing an exemplary shooting composition displayed on the display unit 112. A frame 21 of the shooting composition is displayed on the display unit 112. A first subject 23, a second subject 22, a first index 25, a second index 24, and a third index 26 are displayed inside the frame 21. The second index 24 indicates a focus lens position when the second subject 22 is brought into focus. The first index 25 indicates a focus lens position when the first subject 23 is brought into focus. The third index 26 indicates a current position of the focus lens 12a. An indication of the third index 26 moves in a direction of an arrow 27 by rotating the manual focus ring 14a.

A focus lens position when the second subject 22 is brought into focus by auto focusing (a position at which the second index 24 is displayed) and a focus lens position when the first subject 23 is brought into focus by auto focusing (a position at which the first index 25 is displayed) are found before actual shooting. For this reason, when focus lens positions have been stored in the storage unit 19, the first index 25 is displayed together with a focus lens position at the start of actual shooting (a focus lens position when the second subject 22 is brought into focus) in the frame 21.

The display unit 112 controls display so that the position at which the second index 24 is displayed and the position at which the first index 25 is displayed can be as far away from each other as possible within the frame 21. Thus, even when the space between the first subject 23 and the second subject 22 is narrow, an action of the focus lens 12 can be easily and clearly recognized visually.

The user rotates the manual focus ring 14a at a desired speed while seeing the first index 25 and the second index 24. As a result, a current position of the focus lens 12a detected by the focus lens position detecting unit 18 comes near a focus lens position stored in the storage unit 19. The focusing control unit 111 causes the drive unit 12c to decrease the speed at which the focus lens position 12a is driven. Thus, in the present embodiment, the speed at which the focus lens 12a is driven is controlled irrespective of the user's intent.

Namely, in the present embodiment, according to the relationship between a signal indicative of a current position of the focus lens 12a, which is detected by the focus lens position detecting unit 18, and a position signal stored in the storage unit 19, the amount by which the focus lens 12a is driven relative to movement of the manual focus ring 14a is changed. When an output signal from the focus lens position detecting unit 18 which is indicative of a current position of the focus lens 12a and a position signal stored in the storage unit 19 coincide with each other, the focusing control unit 111 causes the drive unit 12c to stop driving the focus lens 12a. This is to stop driving the focus lens 12a when a current position of the focus lens 12a and a focus lens position stored in the storage unit 19 substantially coincide with each other, and the reason for providing this control will be described with reference to FIGS. 3 and 4.

Figure 3:
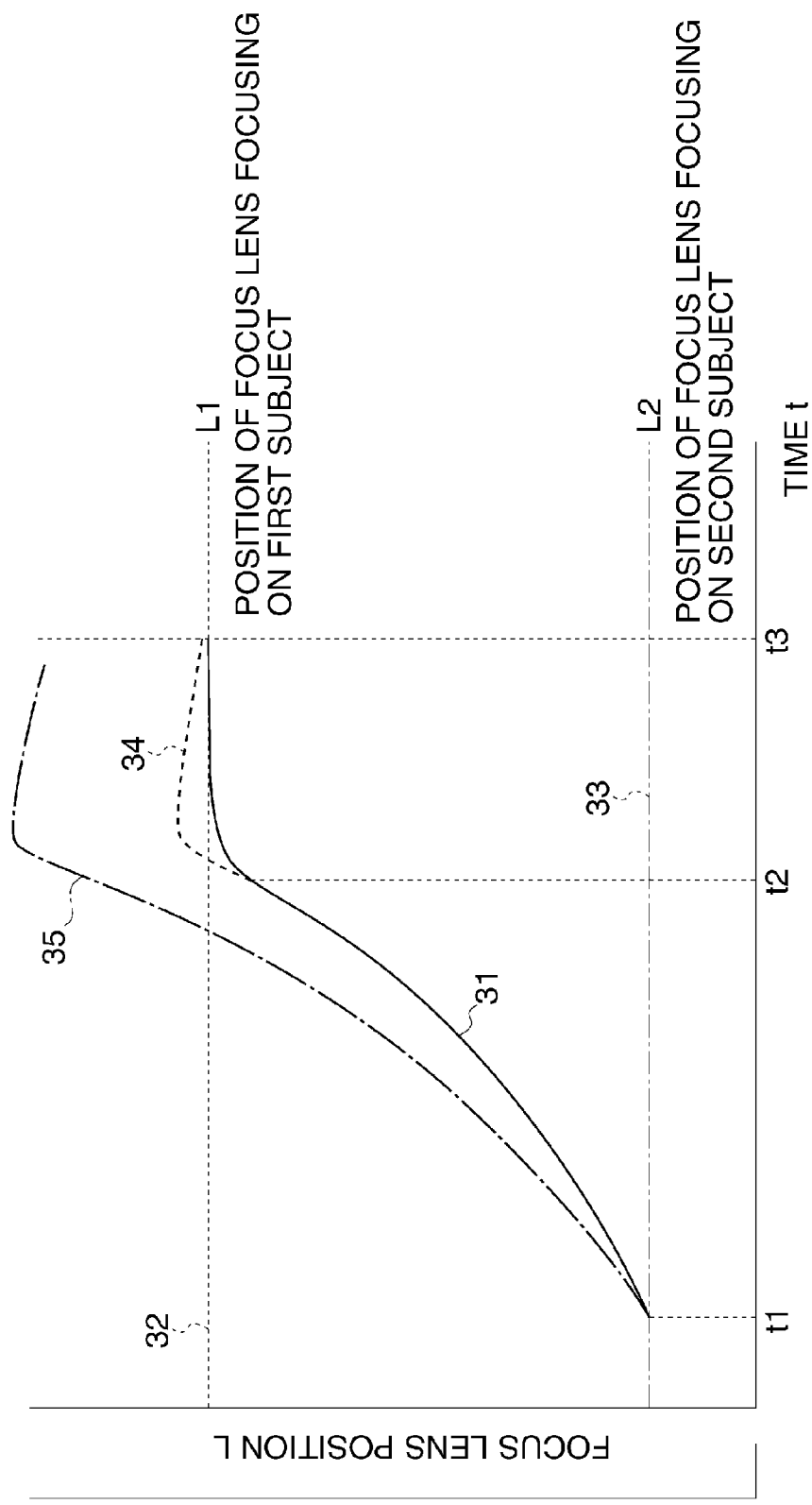
FIG. 3 is a view showing the speed at which a focus lens is driven in the digital video camera in FIG. 1.

FIG. 3 is a view showing the speed at which the focus lens 12a is driven, in which the abscissa indicates time, and the ordinate indicates the position of the focus lens 12a and the rotation angle of the manual focus ring 14a. In FIG. 3, a curve 31 indicates changes in the position of the focus lens 12a, which is driven by the drive unit 12c, as time passes in accordance with rotating operations of the manual focus ring 14a and position signals stored in the storage unit 19. A straight line 32 indicates a position L1 of the focus lens 12a when the first subject is brought into focus, and a straight line 33 indicates a position L2 of the focus lens 12a when the second subject is brought into focus. A curve 34 indicates changes in the position of the focus lens 12a (prior art) in a case where no position signal is stored in the storage unit 19 (no position signal cannot be obtained from the storage unit 19) when the user rotates the manual focus ring 14a. A curve 35 indicates time changes in the rotation angle of the manual focus ring 14a operated by the user.

A waveform of the curve 31 rounds as it comes closer to the position L1 (the speed at which the focus lens 12a is driven decreases independently of the rotation of the focus ring 14a by the user) and stops at the position L1. This is caused by a deviation between an output from the focus lens position detecting unit 18, which is indicative of a current position of the focus lens 12a, and an output from the focus lens position detecting unit 18 when the first subject is brought into focus, which is stored in the storage unit 19. On the other hand, when the focus lens 12a is driven in a manner properly following the curve 35 indicative of an actual rotation of the manual focus ring 14a, the focus lens 12a does not stop at the position L1 as indicated by the curve 34, and hence shooting out of focus is performed.

As a matter of course, the focus lens 12a can be stopped at the position L1 by rotating the manual focus ring 14a in a rigorous manner. To realize this, however, skill is required, and it is necessary to make errors in the rotation angle of the manual focus ring 14a and the temperature, aging, play, and so on of the focus lens 12a sufficiently small, and hence a system that can be readily used cannot be established.

On the other hand, in the present embodiment, a focus state and a position of the focus lens 12a are associated with each other in each actual shooting, and the manual focus ring 14a is used merely to determine a rack focus speed, not to determine a position of the focus lens 12a. Therefore, it is unnecessary to pay attention to the relationship between a rotation angle of the manual focus ring 14a and a position of the focus lens 12a. Moreover, because a focusing state and a position of the focus lens 12a are associated with each other in each actual shooting, errors caused by temperature and aging never occur.

Figure 4:
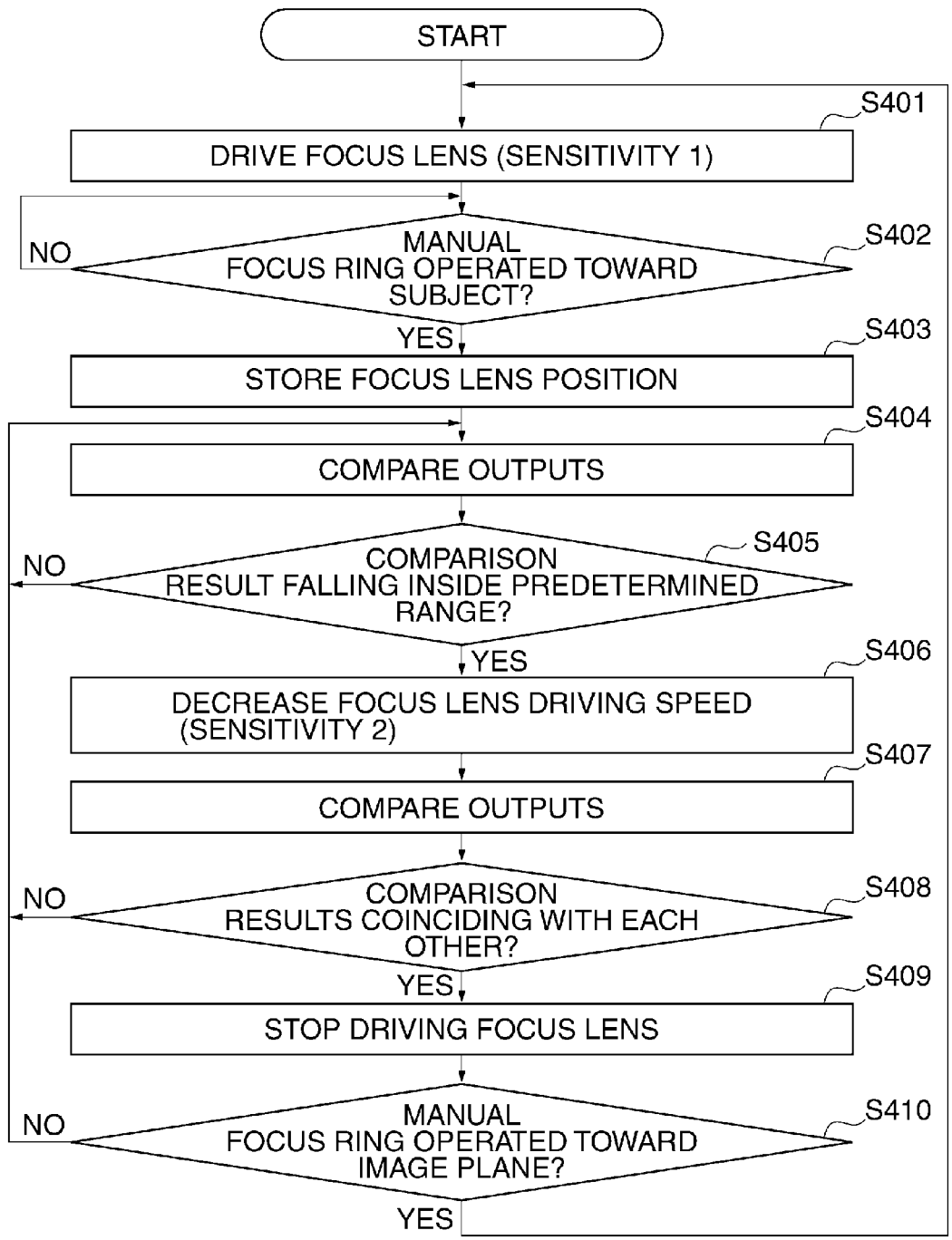
FIG. 4 is a flowchart of a shooting operation performed by the digital video camera in FIG. 1.

FIG. 4 is a flowchart showing a flow of shooting performed by the digital video camera 100, and this flow is started under the control of the control unit 14c when the digital video camera 100 is placed in the manual focus mode.

In step S401, the control unit 14c sets a drive speed for the focus lens 12a according to a speed at which the manual focus ring 14a is rotated. As a result, when the manual focus ring 14a is rotated, the focus lens 12a is driven according to the setting. A sensitivity with which the focus lens 12a is driven in response to the rotation of the manual focus ring 14a at this time is expressed as "the first sensitivity (sensitivity 1)". The first sensitivity is a sensitivity with which the manual focus ring 14a and the focus lens 12a are driven during rack focus in normal manual focusing.

Next, in step S402, the control unit 14c determines whether or not the manual focus ring 14a has been operated in the direction of the arrow 14d in FIG. 1 (toward the subject). The control unit 14c stands by until the manual focus ring 14a has been operated in the direction of the arrow 14d (NO in the step S402), and when the manual focus ring 14a has been operated in the direction of the arrow 14d, the process proceeds to step S403. In the step S403, the control unit 14c stores, in the storage unit 19, an output from the focus lens position detecting unit 18 (a position of the focus lens 12a in the direction of the optical axis) at that point in time when the manual focus ring 14a was operated in the direction of the arrow 14d.

Next, in step S404, the control unit 14c starts comparing an output from the storage unit 19 and an output from an output from the focus lens position detecting unit 18 with each other. Specifically, the control unit 14c obtains a difference between a signal indicative of a current position of the focus lens 12a detected by the focus lens position detecting unit 18 and a position signal stored in the storage unit 19.

Subsequently, in step S405, the control unit 14c determines whether or not the comparison result δ in the step S404 lies inside a predetermined range. When the comparison result δ does not lie inside the predetermined range (NO in the step S405), the process returns to the step S404. In this loop of circulating to the step S404, the user focuses on the second subject and starts actual shooting. When the comparison result δ lies inside the predetermined range (YES in the step S405), the process proceeds to step S406.

In the step S406, the focusing control unit 111 decreases the speed at which the focus lens 12a is driven. A sensitivity with which the focus lens 12a is driven under the control of the focusing control unit 111 at this time is expressed as "the second sensitivity (sensitivity 2)". For example, when the comparison result δ does not lie inside the predetermined range, the speed at which the focus lens 12a is driven relative to an operating speed (rotation speed) ω of the manual focus ring 14a is set, as the first sensitivity, at a sensitivity proportional to the operation speed ω. On the other hand, when the comparison result δ lies inside the predetermined range, the speed at which the focus lens 12a is driven is set, as the second sensitivity, at a speed proportional to a product of the operating speed ω and an amount of change α in the comparison result δ. Here, the amount of change α is a coefficient obtained by normalizing the comparison result δ. The amount of change α is "1" when a difference between a signal indicative of a current position of the focus lens 12a detected by the focus lens position detecting unit 18 and a position signal stored in the storage unit 19 lies inside a set predetermined range, and the amount of change α is "0" when the difference is zero (0). Namely, as the comparison result decreases, the speed at which the focus lens 12a is driven slows down.

Next, in step S407, the control unit 14c compares an output from the storage unit 19 and an output from the focus lens position detecting unit 18. The concrete process in the step S407 is the same as the process in the step S404. In the next step S408, the control unit 14c determines whether or not the comparison result δ in the step S407 is zero, that is, a signal indicative of a current position of the focus lens 12a and a position signal stored in the storage unit 19 coincide with each other. When the comparison result δ is not zero (NO in step S408), the process returns to the step S404.

As the routine from the step S404 to the step S408 is repeated, the current position of the focus lens 12a comes closer to the focus lens position stored in the storage unit 19, and the speed at which the focus lens 12a is driven, which is set in the step S406, is further decreased. When the comparison result δ is zero (YES in the step S408), the process proceeds to step S409. In the step S409, the focusing control unit 111 stops driving the focus lens 12a. Thus, according to the relationship between the current position of the focus lens 12a and the focus lens position stored in the storage unit 19, the focusing control unit 111 changes the relationship between the speed at which the manual focus ring 14a is operated and the speed at which the focus lens 12a is driven.

Then, in step S410, the control unit 14c determines whether or not the manual focus ring 14a has been operated in the direction of the arrow 14e in FIG. 1 (toward the image plane). When the manual focus ring 14a has been operated in the direction of the arrow 14e (YES in the step S410), the control unit 14c resets the stored position of the focus lens 12a for the first subject, and the process returns to the step S401. Namely, the mode in which the focus lens 12a is moved to the focus lens position stored in the storage unit 19 is canceled to continue normal manual focusing. When the manual focus ring 14a has not been operated in the direction of the arrow 14e (NO in the step S410), the process returns to the step S404. By carrying out these processes, the rack focus speed desired by the user can be reflected on the lens barrel, and a subject to be shot can be focused on with accuracy.

As described above, in the present embodiment, a position of the focus lens 12a in the direction of the optical axis, which is detected by the focus lens position detecting unit 18 when a shooting subject in actual shooting is laid at a predetermined position, is stored in the storage unit 19. Then, in actual shooting, according to the relationship between a signal indicative of a current position of the focus lens 12a detected by the focus lens position detecting unit 18 and a position signal stored in the storage unit 19, the amount by which the focus lens 12a is driven relative to movement of the manual focus ring 14 is changed. By using this focusing method, the rack focus speed can freely be adjusted, and a final focusing accuracy for a shooting subject can be made stable.

Manual focus shooting according to the present embodiment described above is extremely useful for shooting scenes explained hereafter. For example, when there are two subjects in filmmaking, there is a shooting scene in which the focus is shifted from one to the other by manual focusing. In this case, a focus lens position for the first subject which is to be eventually focused on is stored in advance in accordance with the present embodiment. Then, in actual shooting, the focus is manually shifted from the second subject being focused on, and the focus is shifted to the stored focus lens position (the first subject position). As a result, actual shooting can be completed with the first subject easily and eventually focused on, and a failure of shooting can be avoided.

Figure 5:
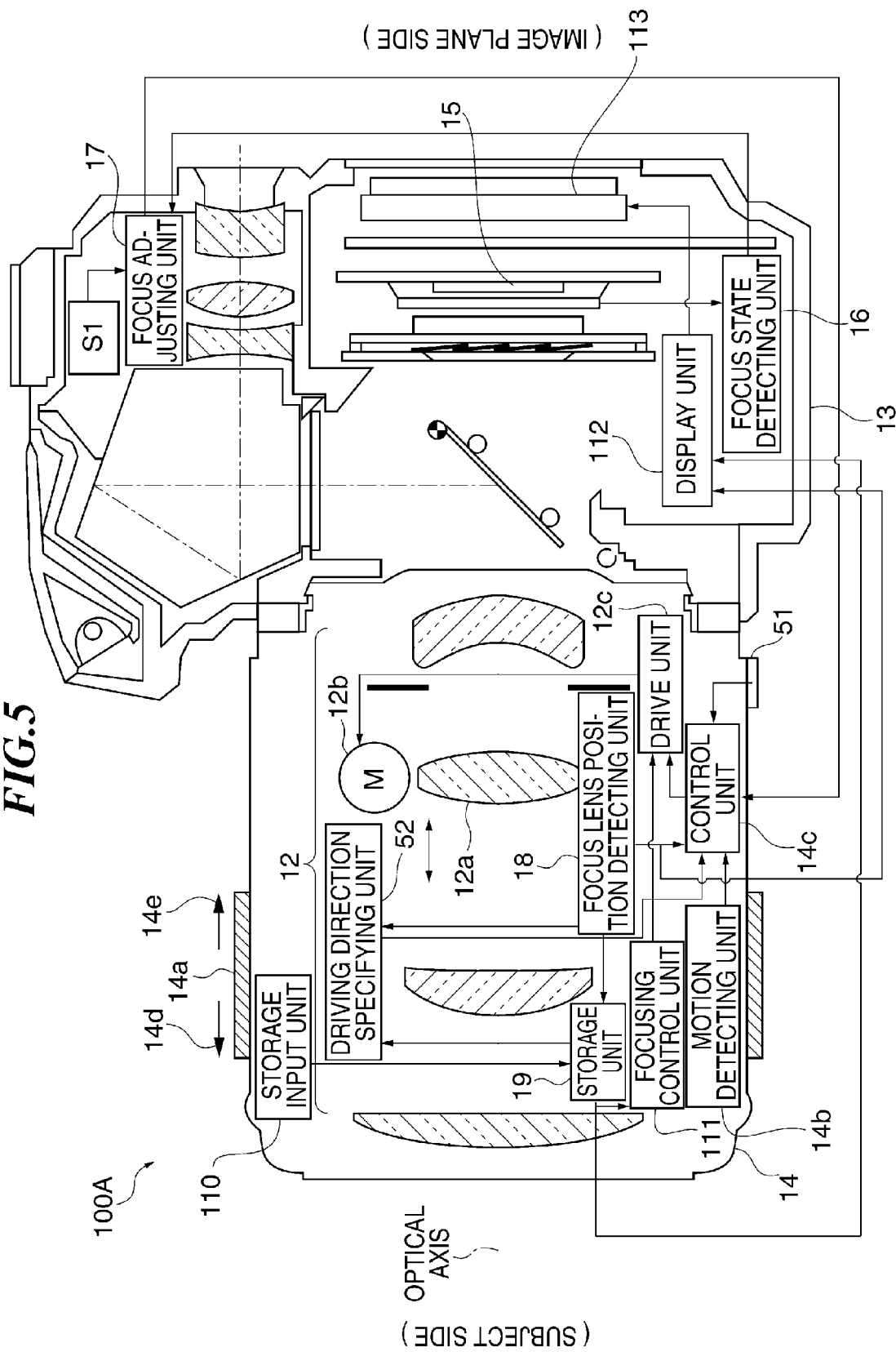
FIG. 5 is a cross-sectional view schematically showing a construction of a digital video camera according to a second embodiment of the present invention.

FIG. 5 is a view schematically showing a construction of a digital video camera 100A according to a second embodiment of the present invention. The digital video camera 100A differs from the digital video camera 100 according to the first embodiment in that the digital video camera 100A is further equipped with a storage focus mode operating unit 51, and a driving direction specifying unit 52. It should be noted that because there are the storage focus mode operating unit 51 and the driving direction specifying unit 52, the focus lens 12a is drivingly controlled in the digital video camera 100A in a different way as will be described later.

In a storage focus mode, as the current position of the focus lens 12a comes near a focus lens position stored in the storage unit 19, the speed at which the focus lens 12a is driven is decreased, and when the current position of the focus lens 12a and the focus lens position coincide with each other, the focus lens 12a is stopped. The control unit 14c is instructed to enter into the storage focus mode by operating the storage focus mode operating unit 51.

The focus lens 12a is not forcefully decelerated and stopped at a focus lens position stored in the storage unit 19 unless the user selects the storage focus mode. Whether the user operates the manual focus ring 14a in the direction of the arrow 14d or the arrow 14e in FIG. 1, the driving direction specifying unit 52 causes the control unit 14c to drive the focus lens 12a toward a focus lens position stored in the storage position 19.

In the second embodiment, there is a merit explained hereafter in having the storage focus mode operating unit 51 and the driving direction specifying unit 52. In the first embodiment, the direction in which the focus lens 12a is driven is set based on the direction in which the manual focus ring 14a is rotated. On the other hand, in the second embodiment, when the storage focus mode is set at the time of actual shooting, the rack focus direction thereafter is limited to a direction from a present position of the focus lens 12a toward a focus lens position stored in the storage unit 19. Namely, irrespective of the direction in which the manual focus ring 14a is rotated, the driving direction specifying unit 52 sets the direction in which the focus lens 12a is driven, so that the speed at which the focus lens 12a is driven can be set only based on the manual focus ring 14a. As a result, shooting can be smoothly performed even when the manual focus ring 14a is operated in a wrong direction.

Figure 6:
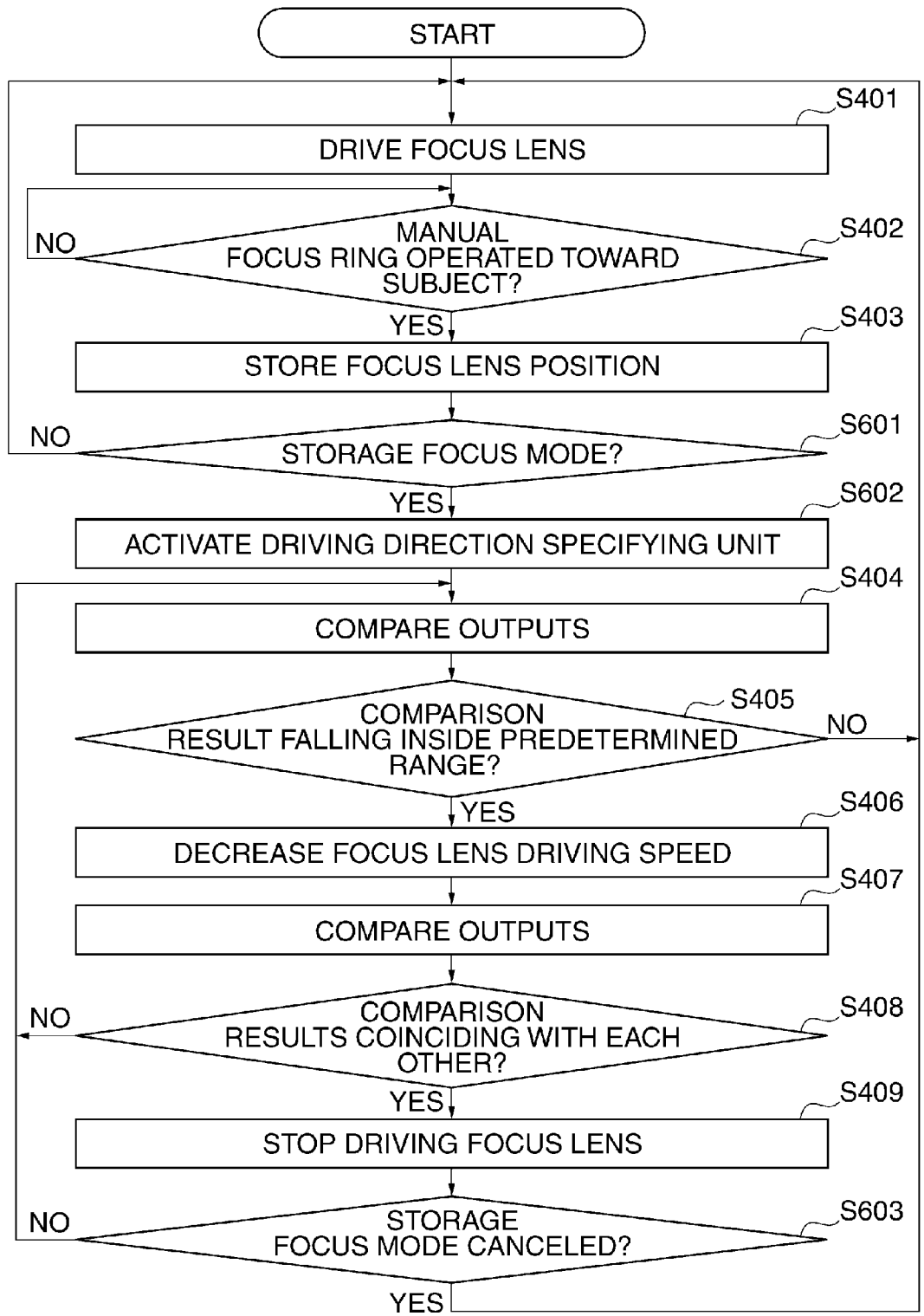
FIG. 6 is a flowchart of a shooting operation performed by the digital video camera in FIG. 5.

FIG. 6 is a flowchart showing a flow of shooting performed by the digital video camera 100A, and this flow is started under the control of the control unit 14c when the digital video camera 100A is placed in the manual focus mode. It should be noted that processes in the flowchart of FIG. 6 which are the same as the processes in the flowchart of FIG. 4 are designated by the same step numbers, and description thereof is omitted here.

In step S601, the control unit 14c determines whether or not the storage focus mode operating unit 51 has been operated. When the storage focus mode operating unit 51 has been operated (YES in the step S601), the process proceeds to step S602. On the other hand, when the storage focus mode operating unit 51 has not been operated (NO in the step S601), the process returns to the step S401, and normal manual focusing is continued.

In the step S602, the control unit 14c activates the driving direction specifying unit 52. The process then proceeds to the step S404. As a result, whether the manual focus ring 14a is rotated in a forward direction or a backward direction (i.e. irrespective of the direction in which the manual focus ring 14a is rotated), the focus lens 12a is driven toward a focus lens position stored in the storage unit 19.

When the focus lens 12a is stopped, the control unit 14c determines in step S603 whether or not the storage focus mode has been canceled. When the storage focus mode has been canceled (YES in the step S603), the process returns to the step S401, and as a result, normal manual focusing is performed. On the other hand, when the storage focus mode has not been canceled (NO in the step S603), the process returns to the step S404.

Thus, in the second embodiment, when the storage focus mode operating unit 51 is not operated, and the digital video camera 100A is not placed in the storage focus mode, the focus lens 12a is not stopped at a focus lens position stored in the storage unit 19. On the other hand, when the digital video camera 100A is placed in the storage focus mode, the focus lens 12a is driven toward a focus lens position stored in the storage unit 19 whether the manual focus ring 14a is rotated in a forward direction or a backward direction. Then, as with the first embodiment, the focus lens 12a is drivingly controlled according to a deviation between a signal indicative of a current position of the focus lens 12a detected by the focus lens position detecting unit 18 and a position signal stored in the storage unit 19. With this arrangement, the rack focus speed can be freely adjusted, and a shooting subject can be focused on even when the manual focus ring 14a is operated in a wrong direction.

Figure 7:
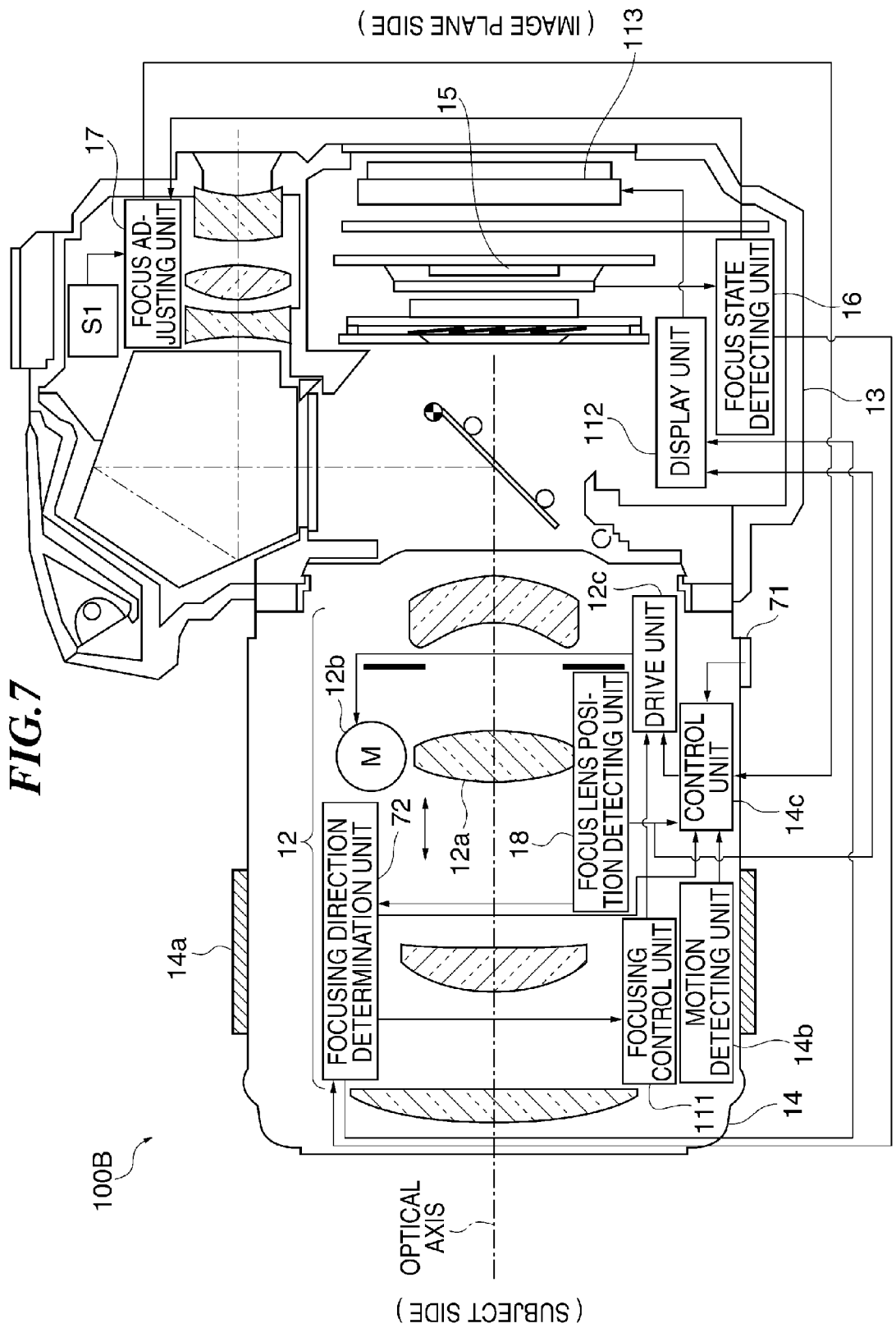
FIG. 7 is a cross-sectional view schematically showing a construction of a digital video camera according to a third embodiment of the present invention.

FIG. 7 is a view schematically showing a construction of a digital video camera 100B according to a third embodiment of the present invention. The digital video camera 100B differs from the digital video camera 100 according to the first embodiment in that the storage unit 19 and the storage input unit 110 are dispensed with, and the digital video camera 100B is equipped with a manual speed mode setting unit 71 and a focusing direction determination unit 72.

The manual speed mode setting unit 72 is an operation unit for making such a setting as to operate the digital video camera 100B in a manual speed mode, which will be described later. The focusing direction determination unit 72 determines a direction in which the focus lens 12a is driven so as to focus on a subject based on an output from the focus state detecting unit 16.

In the third embodiment, a position at which the focus lens 12a is to be stopped is not set in advance as distinct from the first embodiment and the second embodiment. In the manual speed mode, when based on an output from the focus state detecting unit 16, it is determined that the focus lens 12a focuses on a subject, the focusing control unit 111 stops driving the focus lens 12a. Namely, only the rack focus speed of the focus lens 12a can be set by manually operating the manual focus ring 14a.

Figure 8:
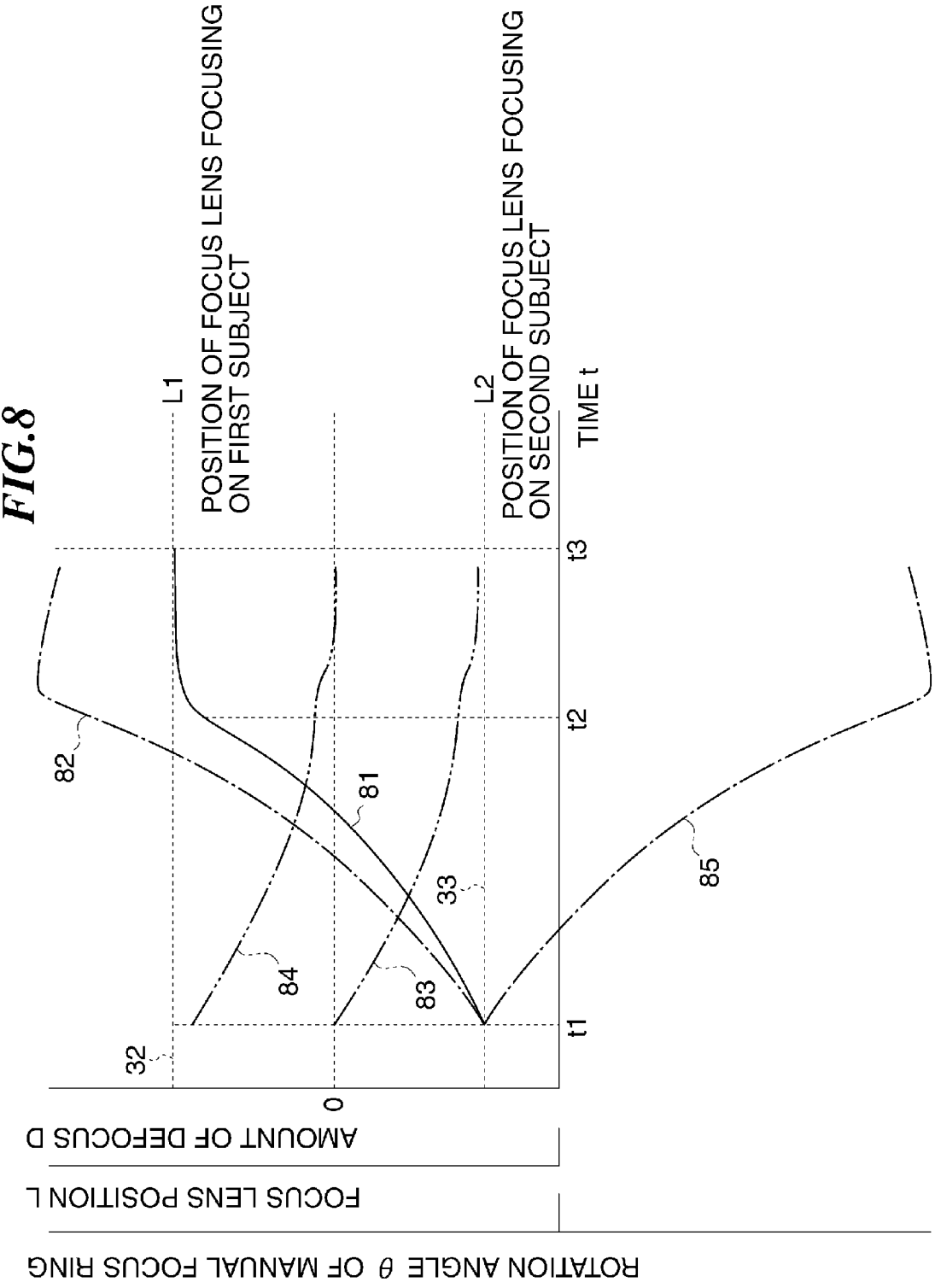
FIG. 8 is a graph showing the speed at which a focus lens is driven in the digital video camera in FIG. 7, as well as outputs from a focus state detecting unit and the rotation angle of a manual focus ring.

FIG. 8 is a graph showing the speed at which the focus lens 12a is driven as well as output from the focus state detecting unit 16 (amount of defocus) and rotation angle of the manual focus ring 14a. In FIG. 8, the abscissa indicates time, and the ordinate indicates a focus state (amount of defocus) which is an output from the focus state detecting unit 16, position of the focus lens 12a, and rotation angle of the manual focus ring 14a.

In FIG. 8, a curve 81 indicates changes in the position of the focus lens 12a as time passes in the manual speed mode. In further detail, the curve 81 indicates changes in the position of the focus lens 12a, which is driven by the drive unit 12c with rotation of the manual focus ring 14a. A straight line 32 indicates the position L1 of the focus lens 12a when the first subject is brought into focus, and a straight line 33 indicates the position L2 of the focus lens 12a when the second subject is brought into focus. A curve 82 indicates time changes in the rotation angle of the manual focus ring 14a. A curve 83 indicates changes in the amount of defocus with respect to the second subject, which is detected by the focus state detecting unit 16, and a curve 84 indicates changes in the amount of defocus with respect to the first subject, which is detected by the focus state detecting unit 16. A curve 85 indicates time changes in the rotation angle of the manual focus ring 14a as with the curve 82, but the rotating direction of the manual focus ring 14a is opposite to that in the case of the curve 82.

Assume that at a time t1, the user focuses on the second subject. At this time, as indicated by the curve 83, the amount of defocus with respect to the second subject, which is detected by the focus state detecting unit 16 is zero (0), and the second subject is in focus. When the manual focus ring 14a is rotated in this state, the focus state detecting unit 16 calculates the amount of defocus with respect to the first subject, which is the next subject, (the curve 84) in response to the rotating operation.

When the calculated amount of defocus with respect to the first subject is greater than a predetermined value, the control unit 14c causes the drive unit 12c to drive the focus lens 12a in accordance with the curve 81 based on the rotating operation of the manual focus ring 14a. A sensitivity with which the focus lens 12a is driven in response to the rotating operation of the manual focus ring 14a is expressed as "the third sensitivity (sensitivity 3)". The third sensitivity is a sensitivity with which the manual focus ring 14a and the focus lens 12a are driven when the focus is shifted by so-called normal manual focusing, and is equal to the first sensitivity in the first embodiment.

As the focus lens 12a is driven (moved), the amount of defocus with respect to the first subject, which is output from the focus state detecting unit 16, decreases as indicated by the curve 84. When the amount of defocus with respect to the first subject becomes smaller than a predetermined value (for example, twice as large as the amount of defocus clearly recognized), the focusing control unit 111 decreases the drive speed of the focus lens 12a. A sensitivity with which the focus lens 12a is driven under the control of the focusing control unit 111 at this time is expressed as "the fourth sensitivity (sensitivity 4)". When the amount of defocus with respect to the first subject becomes zero (that is, the first subject is brought into focus), the operation of the focus lens 12a is stopped.

Thus, in the third embodiment, when the amount of defocus with respect to the first subject (the subject in actual shooting), which is output from the focus state detecting unit 16, becomes equal to or smaller than the predetermined value in the manual speed mode, the rack focus speed of the focus lens 12a is automatically decreased. When the amount of defocus with respect to the first subject becomes zero, that is, the first subject is brought into focus, the operation of the focus lens 12a is automatically stopped.

It should be noted that as indicated by the curve 85 in FIG. 8, even when the rotating direction of the manual focus ring 14a is opposite to that in the case of the curve 82, the focus lens 12a is moved so as to focus on the first subject as indicated by the curve 81. This is because based on an output from the focus state detecting unit 16, the focusing direction determination unit 72 determines a direction in which the focus lens 12a is driven so as to focus on the first subject. Therefore, the focus lens 12a is driven based on an output from the focus state detecting unit 16 irrespective of a direction in which the manual focus ring 14a is driven, and hence even when the manual focus ring 14a is rotated in a wrong direction by mistake, stable shooting can be continued.

Figure 9:
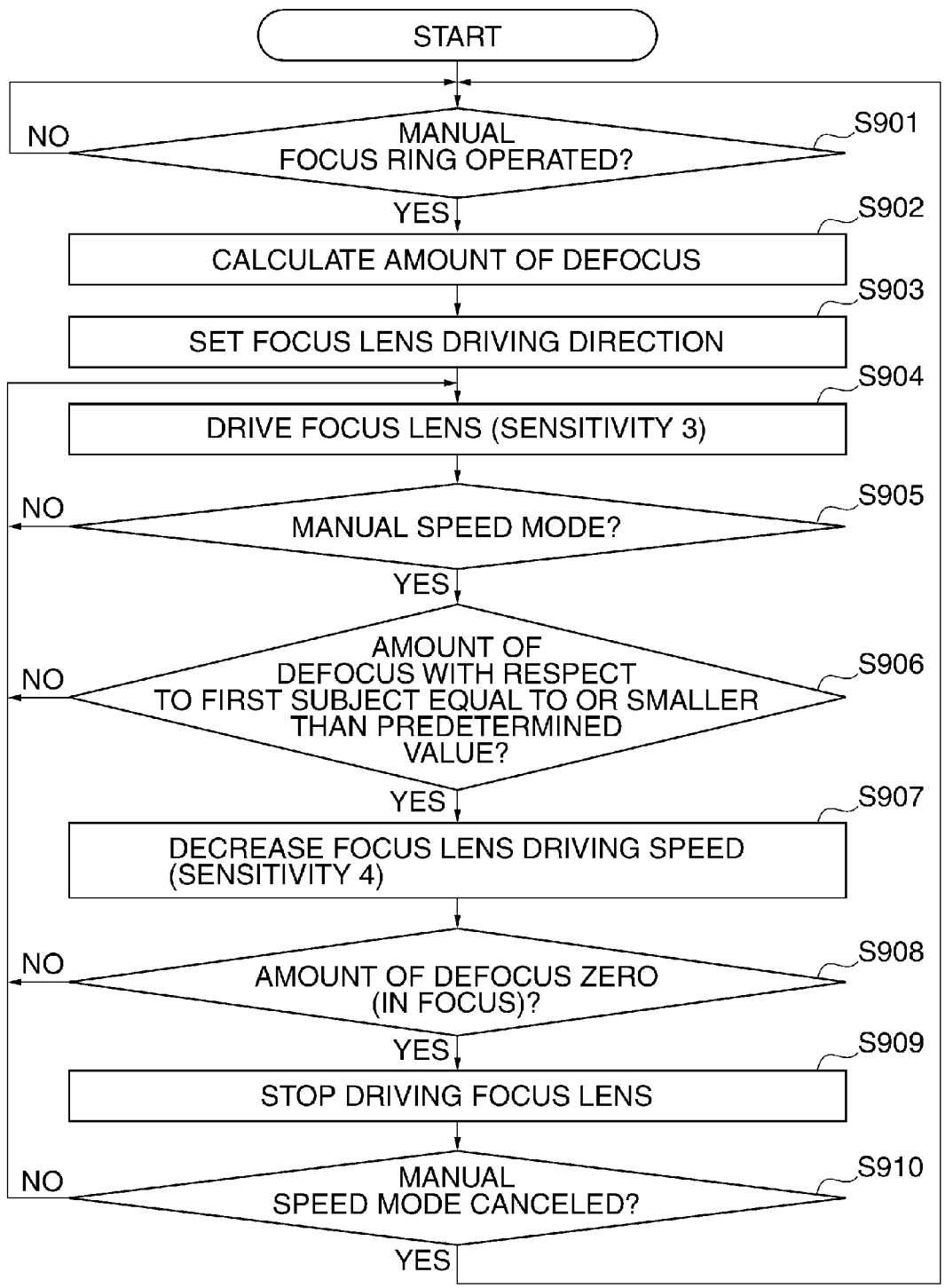
FIG. 9 is a flowchart of a shooting operation performed by the digital video camera in FIG. 7.

FIG. 9 is a flowchart showing a flow of shooting performed by the digital video camera 100B, and this flow is started under the control of the control unit 14c when the digital video camera 100B is placed in the manual focus mode.

First, in step S901, the control unit 14c determines whether or not the manual focus ring 14a has been rotated. The control unit 14c stands by until the manual focus ring 14a has been rotated (NO in the step S901), and when the manual focus ring 14a has been rotated (YES in the step S901), the process proceeds to step S902.

In the step S902, the focus state detecting unit 16 calculates the amount of defocus of a subject (first subject) lying next to a currently-detected subject (second subject). Next, in step S903, based on the amount of defocus calculated in the step S902, the control unit 14c sets a driving direction in which the focus lens 12a is driven. Then, in step S904, the control unit 14c causes the drive unit 12c to drives the focus lens 12a in the driving direction set in the step S903. The speed at which the focus lens 12a is driven at this time is set to the third sensitivity described above in accordance with the rotating operation of the manual focus ring 14a.

Then, in step S905, the control unit 14c determines whether or not the digital video camera 100B is placed in the manual speed mode. When the digital video camera 100B is placed in the manual speed mode (YES in the step S905), the process proceeds to step S906, and when the digital video camera 100B is not placed in the manual speed mode (NO in the step S905), the process returns to the step S904.

In the step S906, the control unit 14c determines whether or not the amount of defocus with respect to the first subject, which is detected by the focus state detecting unit 16, is equal to or smaller than a predetermined value. When the amount of defocus with respect to the first subject is equal to or smaller than the predetermined value (YES in the step S906), the process proceeds to step S907, and when the amount of defocus with respect to the first subject is not equal to or greater than the predetermined value (NO in the step S906), the process returns to the step S904.

In the step S907, the focusing control unit 111 decreases the speed at which the focus lens 12a is driven. The speed at which the focus lens 12a is driven at this time is set at the fourth sensitivity described above. For example, the speed at which the focus lens 12a is driven is set at a speed proportional to the operating speed ω of the manual focus ring 14a, but when the amount of defocus D with respect to the first subject becomes equal or smaller than the predetermined value, the speed at which the focus lens 12a is driven is set at a driving speed proportional to the product of the operating speed ω and the amount of change β. Here, the amount of change β is the amount of change of the amount of defocus D with respect to the first subject, is "1" when the amount of defocus D becomes equal or smaller than the predetermined value, and "0" when the amount of defocus D becomes zero (0). Therefore, as the amount of defocus D decreases, the speed at which the focus lens 12a is driven slows down. As a result of the step S907, as the position of the focus lens 12a comes closer to a focus position for the first subject, the speed at which the focus lens 12a is driven is decreased.

In step S908, the control unit 14c determines whether or not the amount of defocus with respect to the first subject has become zero (whether or not the first subject has been brought into focus). When the amount of defocus with respect to the first subject is not zero (NO in the step S908), the process returns to the step S904, and when the amount of defocus with respect to the first subject is zero (YES in the step S908), the process proceeds to step S909.

In the step S909, the focusing control unit 111 stops the operation of the focus lens 12a. Then, in step S910, the control unit 14c determines whether or not the manual speed mode has been canceled. When the manual speed mode has been canceled (YES in the step S910), the process returns to the step S901, and when the manual speed mode has not been canceled (NO in the step S910), the process returns to the step S904.

Thus, in the third embodiment, the rack focus speed can be freely adjusted, and the direction in which the focus lens 12a is driven can be automatically determined according to a focusing state. Therefore, even when the user operates the manual focus ring 14a in a wrong direction by mistake, a shooting subject can be brought into focus by stable rack focus.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-164131, filed Aug. 7, 2013, which is hereby incorporated by reference herein in its entirety.

What is claimed is:

1. An optical apparatus comprising:
    a focus lens configured to be movable in a direction of an optical axis;
    a manual focus ring configured to be rotatable;
    a drive unit configured to drive said focus lens in the direction of the optical axis;
    a drive control unit configured to control operation of said focus lens via said drive unit in accordance with rotation of said manual focus ring;
    a position detecting unit configured to detect a position of said focus lens in the direction of the optical axis;
    a storage unit configured to store the position of said focus lens detected by said position detecting unit when said focus lens lies at a predetermined position; and
    a focusing control unit configured to, according to a relationship between a signal indicative of a current position of said focus lens, which is detected by said position detecting unit, and a signal indicative of the position of said focus lens, which is stored in said storage unit, change an amount by which said focus lens is driven relative to rotation of said manual focus ring, independently of said drive control unit.

2. The optical apparatus according to claim 1, wherein said storage unit stores a position of said focus lens that is focusing on a predetermined subject.

3. The optical apparatus according to claim 1, wherein, when the current position of said focus lens, which is detected by said position detecting unit, comes near the position of said focus lens, which is stored in said storage unit, said focusing control unit decreases a speed at which said focus lens is driven, and when the current position of said focus lens, which is detected by said position detecting unit, coincides with the position of said focus lens, which is stored in said storage unit, stops driving said focus lens.

4. The optical apparatus according to claim 1, further comprising:
    a mode operation unit configured to instruct said drive control unit to enter a storage focus mode in which said focus lens is moved to the position of said focus lens, which is stored in said storage unit; and
    a driving direction specifying unit configured to, when the storage focus mode is designated, specify a direction from the current position of said focus lens toward the position of said focus lens, which is stored in said storage unit, as a driving direction in which said focus lens is driven, irrespective of a rotating direction of said manual focus ring.

5. A focusing method implemented by an optical apparatus, comprising:
    a storage step of storing a position of a focus lens in a direction of an optical axis when the focus lens focuses on a first subject;
    a focusing step of focusing on a second subject different from the first subject;
    a driving step of, according to a rotating speed of a manual focus ring, driving the focus lens from a state of focusing on the second subject into a state of focusing on the first subject;
    a detecting step of detecting a current position of the focus lens; and
    a control step of, when the current position of the focus lens, which is detected in said detecting step, comes near the position of the focus lens, which is stored in said storage step, decreasing a speed at which the focus lens is driven, and when the current position of the focus lens, which is detected in said detecting step, coincides with the position of the focus lens, which is stored in said storage step, stopping driving the focus lens.

* * * * *